(12) United States Patent
Eck et al.

(10) Patent No.: US 12,116,831 B2
(45) Date of Patent: Oct. 15, 2024

(54) WINDOW ASSEMBLY

(71) Applicant: Eckco Plastics, Inc., Mishawaka, IN (US)

(72) Inventors: Gary A. Eck, Mishawaka, IN (US); John D. Black, Mishawaka, IN (US)

(73) Assignee: Gary A. Eck, Mishawka, IN (US)

( * ) Notice: Subject to any disclaimer, the term of this patent is extended or adjusted under 35 U.S.C. 154(b) by 0 days.

(21) Appl. No.: 17/895,000

(22) Filed: Aug. 24, 2022

(65) Prior Publication Data

US 2023/0175312 A1 Jun. 8, 2023

Related U.S. Application Data

(63) Continuation of application No. 16/530,582, filed on Aug. 2, 2019, now Pat. No. 11,466,507.

(51) Int. Cl.
| | |
|---|---|
| *E06B 3/46* | (2006.01) |
| *B60J 1/16* | (2006.01) |
| *E06B 3/66* | (2006.01) |

(52) U.S. Cl.
CPC ............ *E06B 3/4618* (2013.01); *B60J 1/16* (2013.01); *E06B 3/66* (2013.01)

(58) Field of Classification Search
CPC .......... E06B 3/46; E06B 3/4609; E06B 3/469; E06B 3/4618; E06B 3/66; E06B 3/42; E06B 3/26347; E06B 3/26; E06B 2003/262; B60J 10/23; B60J 10/242; B60J 1/007; B60J 1/08; B60J 1/085; B60J 1/10; B60J 1/16
See application file for complete search history.

(56) References Cited

U.S. PATENT DOCUMENTS

| | | | | |
|---|---|---|---|---|
| 3,893,261 | A * | 7/1975 | Cribben | E05B 65/0835 49/449 |
| 4,233,781 | A * | 11/1980 | Roe | E06B 3/4681 49/504 |
| 5,799,444 | A * | 9/1998 | Freimark | B60J 1/1853 49/213 |
| 6,116,321 | A * | 9/2000 | Kavchar | B60J 1/16 160/315 |
| 7,934,342 | B2 * | 5/2011 | Lahnala | B60J 1/1853 49/413 |
| 2008/0122262 | A1 * | 5/2008 | Cicala | B60J 1/1853 49/419 |

* cited by examiner

*Primary Examiner* — Jessica L Laux
(74) *Attorney, Agent, or Firm* — Crump Law P.C.

(57) ABSTRACT

A light-weight unitary window assembly for recreational vehicles and trailers. The window assembly uses a two piece design that seats within the wall or door opening and incorporates a fixed window pane integrally molded into one of the polymer frame halves. The window assembly also uses a plurality of weep holes that extend through the frame halves to vacate water from the window assembly to the exterior of the vehicle or trailer wall. In an exemplary embodiment, the window assembly also includes a sliding window pane that slides along a peripheral track and securely seats in a closed position using a plurality of contact pads to prevent window "chatter." The window assembly also includes an integrated latch mechanism to secure the sliding pane.

3 Claims, 20 Drawing Sheets

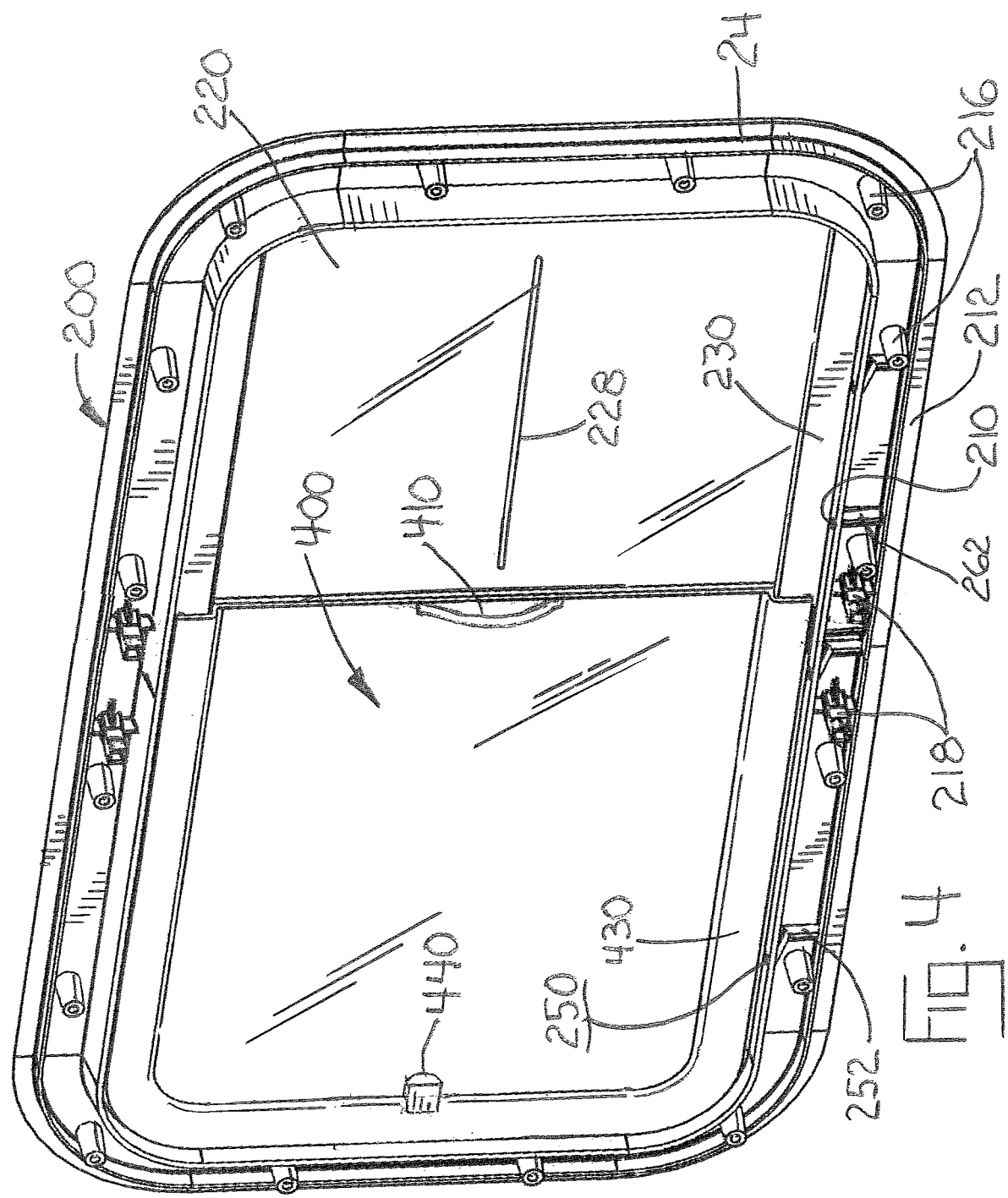

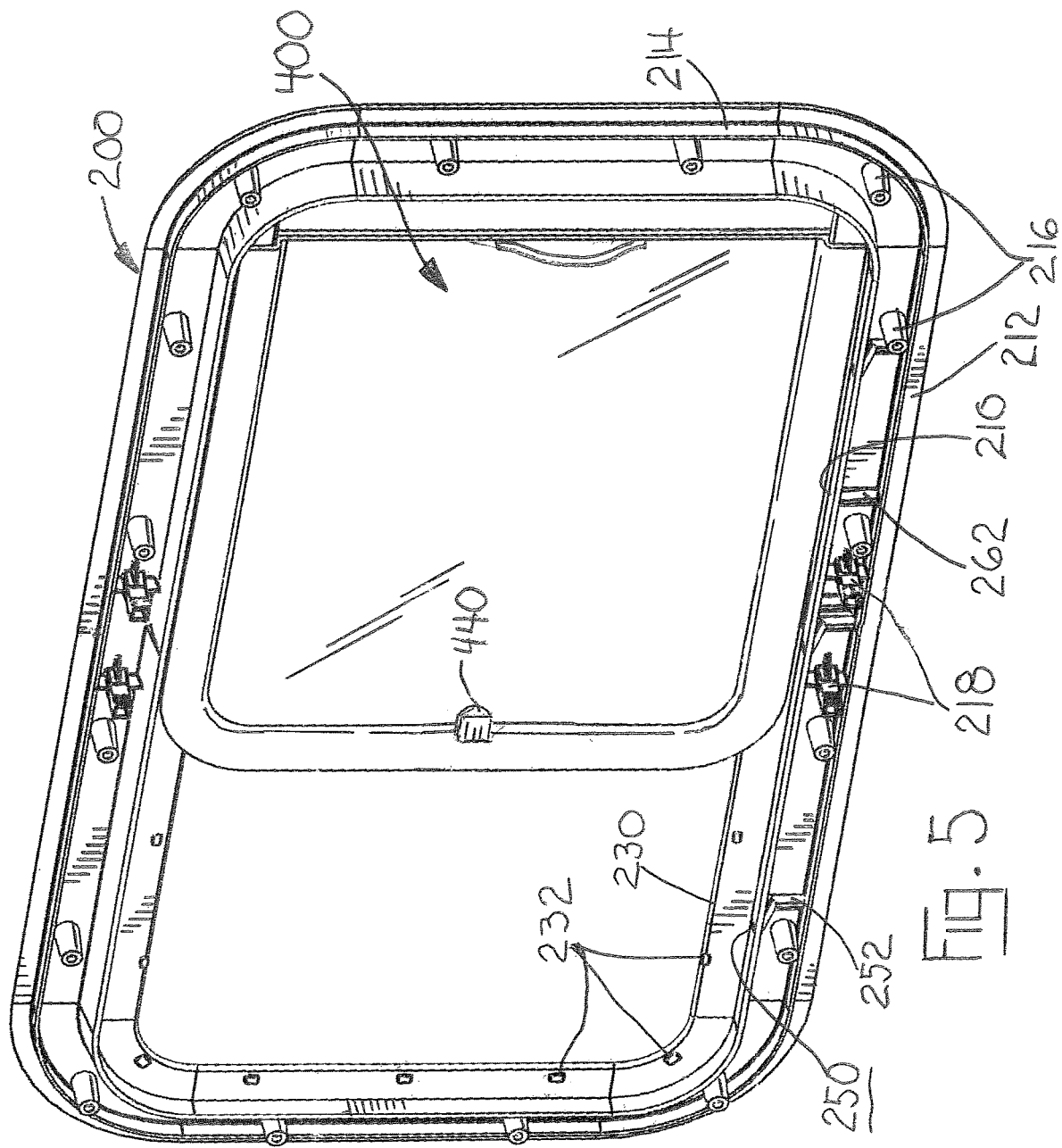

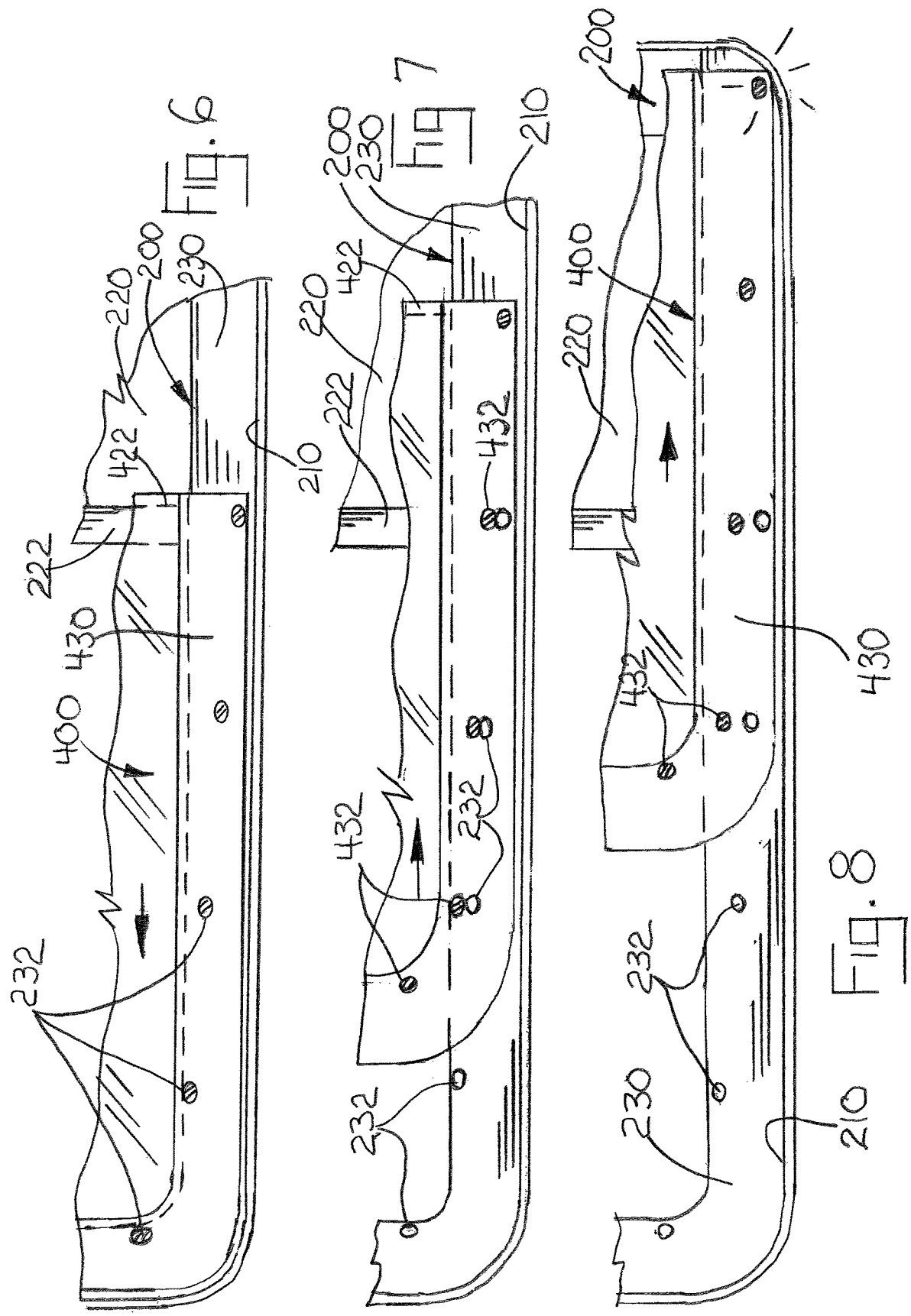

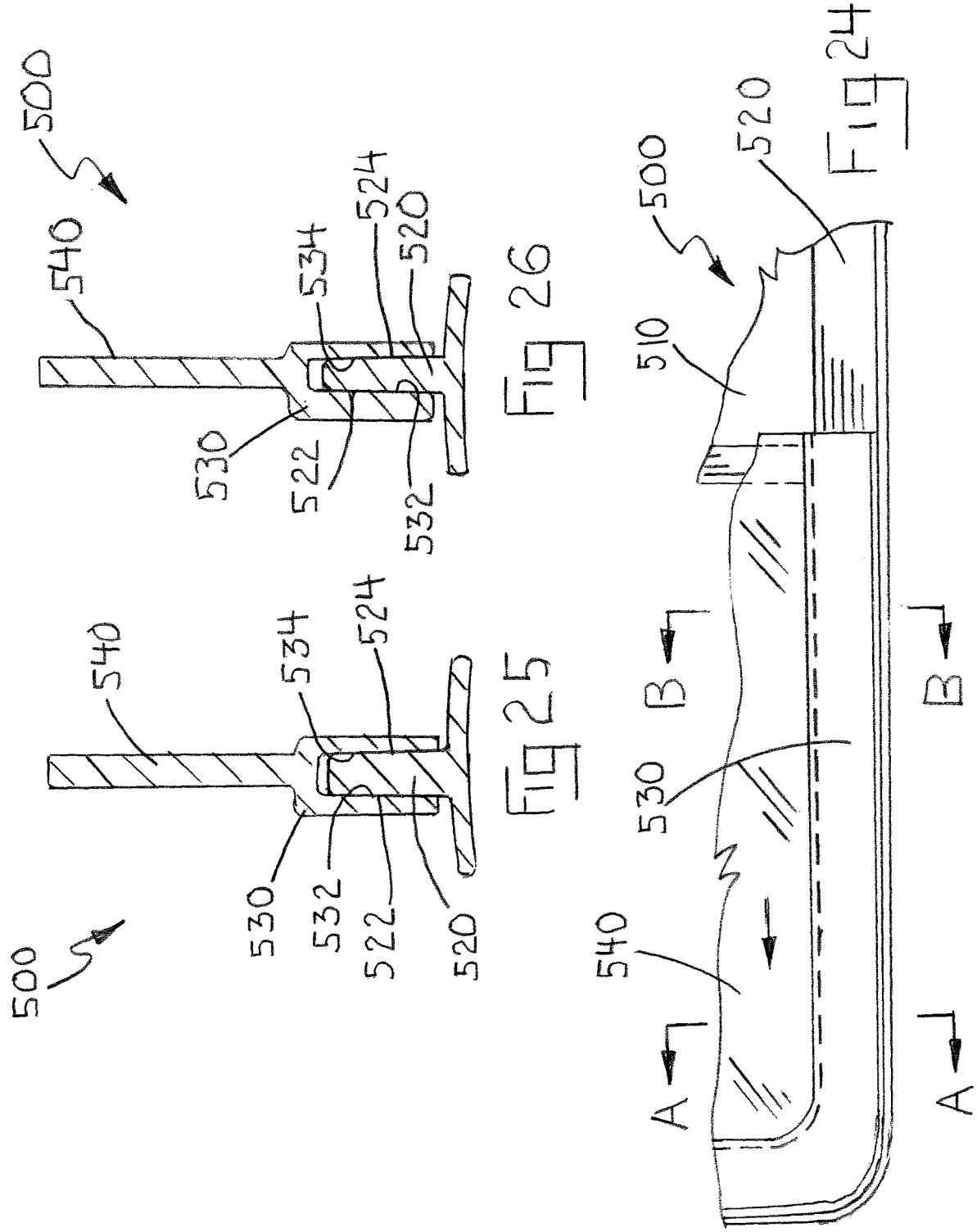

WINDOW ASSEMBLY

This is a continuation of pending U.S. patent application Ser. No. 16/530,582 filed on Aug. 2, 2019, which claims the benefit of U.S. Provisional Application No. 62/714,067 filed Aug. 2, 2018.

This invention relates to window assemblies for recreational vehicles, trailers, prefabricated buildings, and similar light weight structures, and in particular, a window assembly having an integral fixed window pane molded into the window frame.

BACKGROUND AND SUMMARY OF THE INVENTION

In many recreational vehicles and trailers, weight savings is an important design consideration. Conventional window assemblies for recreational vehicles and trailers use separate fixed and sliding window panes fitted between a pair of frame halves that fasten together to secure the assembly within the wall or door opening. The use of separate window panes necessitates the used of various gaskets and seals around the pane and frame interfaces, as well as around the assembly and wall opening to prevent water penetration. Moreover, the use of separate window panes adds significant weight, as well as, adding component and fabrication costs and complexity to the window assembly.

The window assembly of this invention provides a lightweight, unitary window assembly for recreational vehicles, trailers, prefabricated buildings, and similar light weight structures. The window assembly of this invention uses a two piece design that seats within the wall or door opening and incorporates a fixed window pane integrally molded into one of the polymer frame halves. The window assembly also uses a plurality of weep holes that extends through the frame halves to vacate water from the window assembly to the exterior of the vehicle or trailer wall. In an exemplary embodiment, the window assembly also includes a sliding window pane that slides along a peripheral track and securely seats in a closed position using a plurality of contact pads to prevent window "chatter", i.e. the clattering of the window pane within the frame caused by winds and movement of the vehicle or trailer. The sliding pane is also secured using a latch mechanism integrated into a frame half.

The window assembly of this invention provides several advantages and addresses several issues found in conventional window assemblies. The integration of the window pane of the fixed window pane into a unitary molded frame component reduces the overall weight of the window assembly without sacrificing functionality or increasing fabrication or installation costs. The contact pads and latch mechanism are integrated into the molded construction of the frame halves and sliding pane to conveniently secure the sliding pane closed and reduce window chatter. Incorporating weep holes eliminates water and condensation issues that typically plague conventional window assemblies for recreational vehicles and trailers.

The above described features and advantages, as well as others, will become more readily apparent to those of ordinary skill in the art by reference to the following detailed description and accompanying drawings.

BRIEF DESCRIPTION OF THE DRAWINGS

The present invention may take form in various system and method components and arrangement of system and method components. The drawings are only for purposes of illustrating exemplary embodiments and are not to be construed as limiting the invention. The drawings illustrate the present invention, in which:

FIG. 4 is an interior perspective view of the exterior frame and sliding pane of the window assembly of FIG. 1 shown in a closed position;

FIG. 5 is an interior perspective view of the exterior frame and sliding pane of the window assembly of FIG. 1 shown in an open position;

FIG. 6 is a partial side view of the exterior frame and sliding pane of the window assembly of FIG. 1 shown in a closed position;

FIG. 7 is a partial side view of the exterior frame and sliding pane of the window assembly of FIG. 1 shown in a partially closed position;

FIG. 8 is a partial side view of the exterior frame and sliding pane of the window assembly of FIG. 1 shown in an open position;

FIG. 24 is a partial side view of the exterior frame and sliding pane of a second exemplary embodiment of the window assembly of this invention, shown in a closed position FIG. 25 is a partial sectional view of the exterior frame and sliding pane of the window assembly of FIG. 24 taken along line A-A;

FIG. 26 is a partial sectional view of the exterior frame and sliding pane of the window assembly of FIG. 24 taken along line B-B.

DESCRIPTION OF THE PREFERRED EMBODIMENT

In the following detailed description of the preferred embodiments, reference is made to the accompanying drawings that form a part hereof, and in which is shown by way of illustration specific preferred embodiments in which the invention may be practiced. These embodiments are described in sufficient detail to enable those skilled in the art to practice the invention, and it is understood that other embodiments may be utilized and that logical, structural, mechanical, electrical, and chemical changes may be made without departing from the spirit or scope of the invention. To avoid detail not necessary to enable those skilled in the art to practice the invention, the description may omit certain information known to those skilled in the art. The following detailed description is, therefore, not to be taken in a limiting sense, and the scope of the present invention is defined only by the appended claims.

Figure 1:
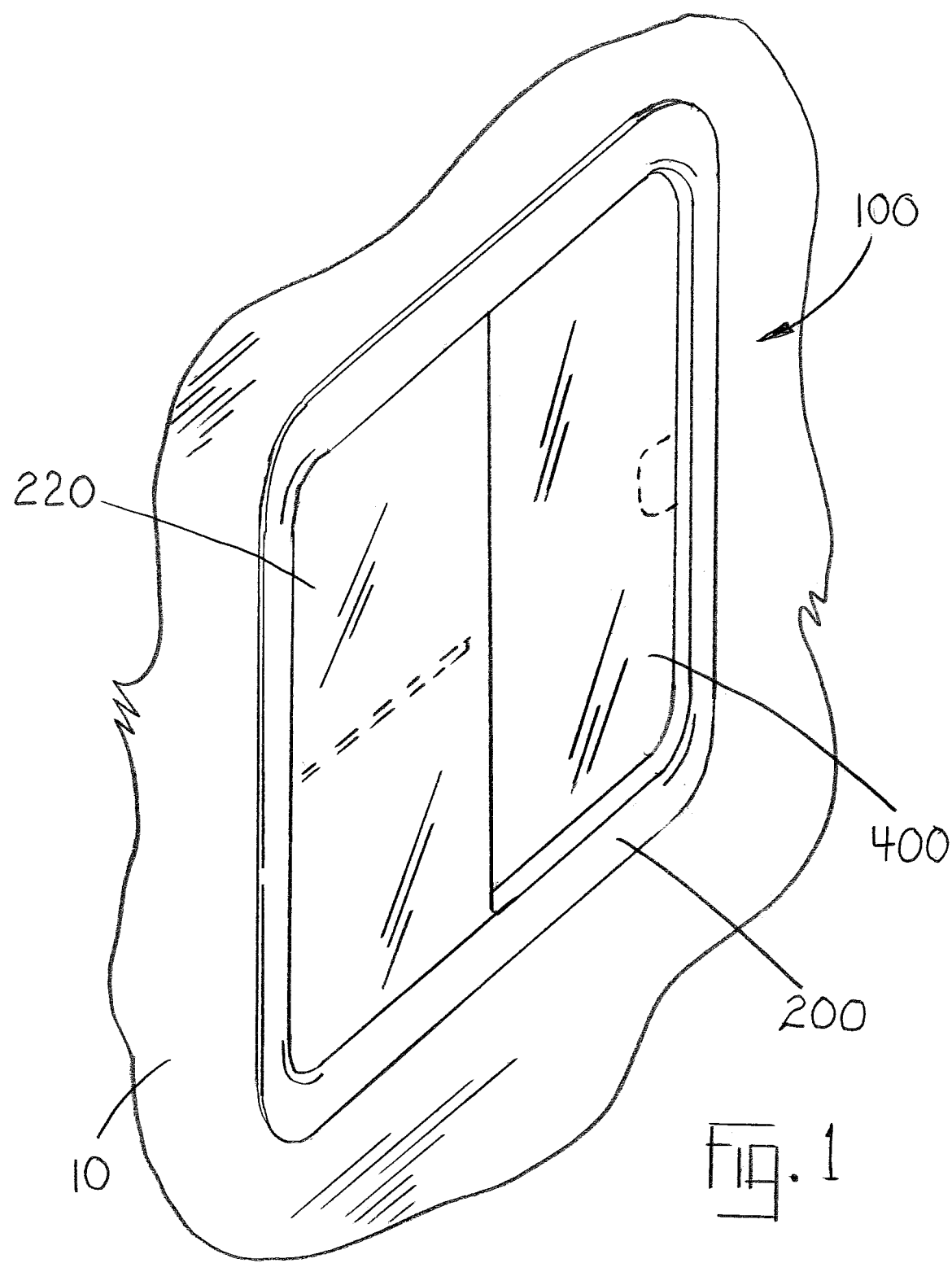
FIG. 1 is an exterior perspective view of an exemplary embodiment of the window assembly of this invention.
Figure 2:
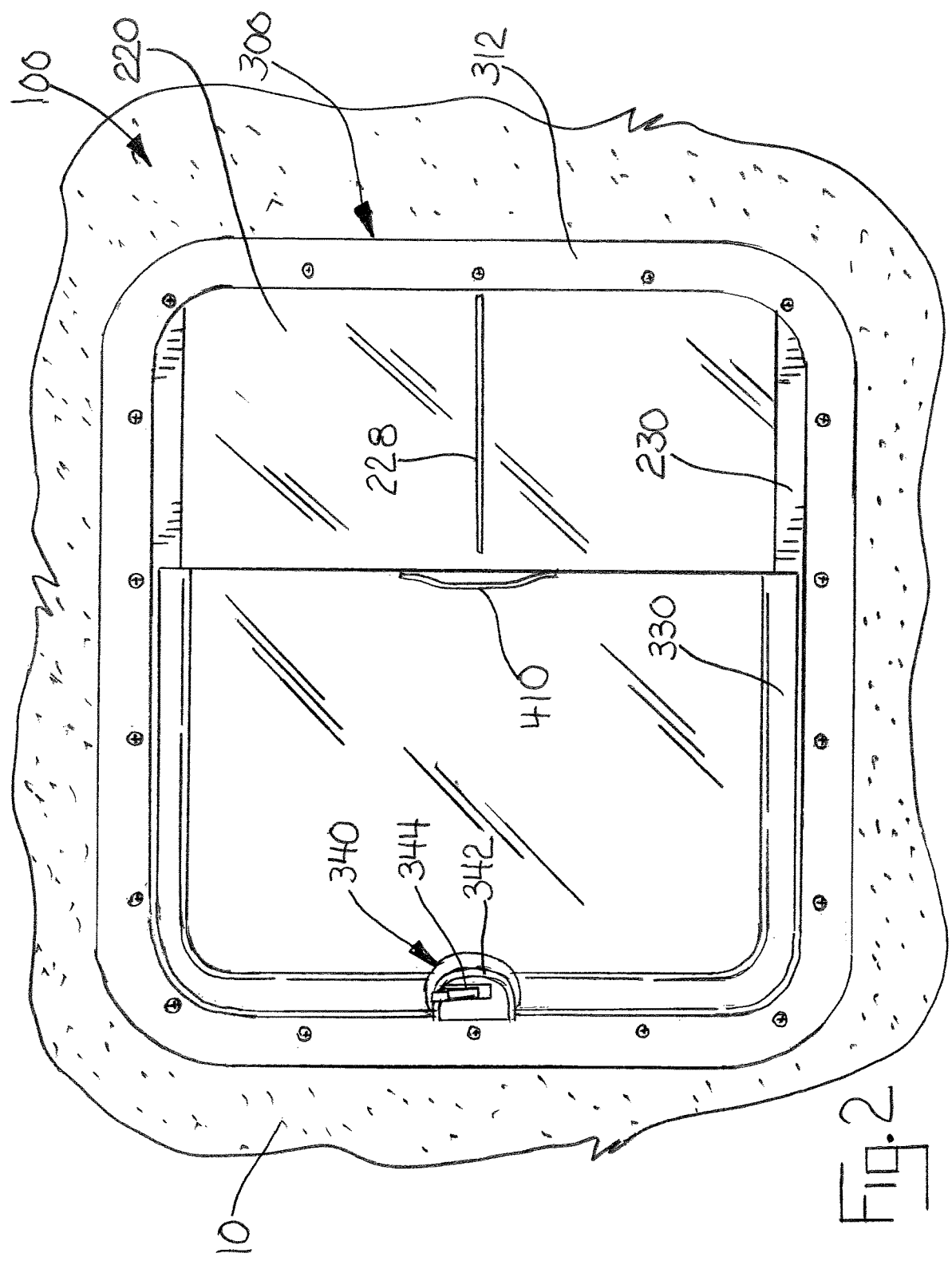
FIG. 2 is an interior front view of the window assembly of FIG. 1.
Figure 3:
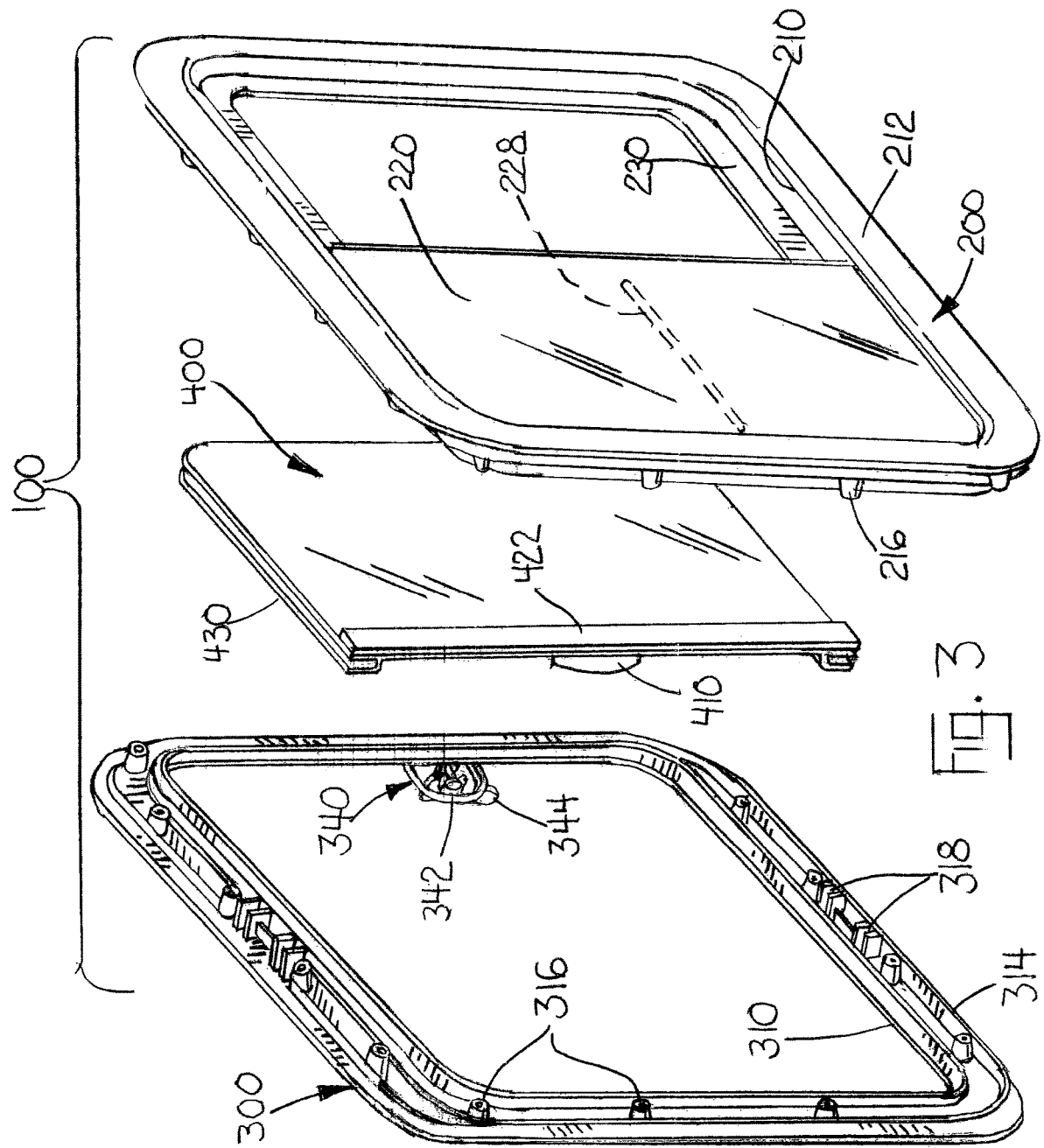
FIG. 3 is an exploded perspective view of the window assembly of FIG. 1.

Referring now to the drawings, FIGS. 1-23 illustrate an exemplary embodiment of the window assembly of this invention, which is designated generally as reference numeral 100. Window assembly 100 uses a two piece frame design with interior and exterior frame halves 200 and 300. Frame halves 200 and 300 are seated within the wall opening sandwiching wall panel 10 between the two halves. Window assembly 100 also includes a fixed window pane 220 and a sliding window pane 400. The fixed window pane 220 is integrally molded as part of exterior frame half 200. Sliding window pane 400 can be manually slid between a closed position (FIG. 1) and an open position (FIG. 5) relative to fixed window pane 200. Sliding window pane 400 slides behind fixed window pane 220 in the open position to allow access through the wall opening and slides laterally from the fixed pane to the closed position to completely enclose the wall opening.

Window assembly 100 is intended primarily for use as a light-weight window for recreational vehicles and trailers, but may be used in other applications. For ease of explanation, window assembly 100 is illustrated and described hereinafter mounted within a rectangular opening in a monocoque laminate wall panel 10. Monocoque laminate structural panels are commonly used for wall and doors in recreational vehicles, trailers, prefabricated buildings, and similar lightweight structures. Monocoque laminate wall panels have an internal wood or metal skeleton and an insulated core sandwiched between outer panel skins. Monocoque laminate wall panels are lightweight, thin and sturdy and have finished skin surfaces. While window assembly 100 is illustrated used with a conventional monocoque laminate wall panel, the window assembly may be adapted for use in other applications, including other conventional wall or door structures. In addition, window assembly 100 as illustrated is configured to fit into the rectangular space of the wall opening, but may be configured and dimensioned to fit into any shape or size opening in the wall or door panel of the particular application.

Frame halves 200 and 300 are ideally formed, molded or otherwise fabricated from a suitable polymer plastic. Typically, both frame halves are molded from an opaque polymer plastic of a desired decorative color. Frame halves 300 and 400 are configured to fit their intended wall openings, and as shown have a generally rectangular configuration. Frame halves 300 and 400 are complimentary components that are fastened together and share several complimentary structural features. Each frame half 200 and 300 has a generally flat peripheral sill 210 and 310 and a flat peripheral apron that abuts and overlies opposed sides of wall panel 10 when window assembly 100 is seated within the wall opening. Frame halves 200 and 300 also have second peripheral flanges 214 and 314 that extend from the facing sides of aprons 212 an 312 that abut against wall 10 and support window assembly 100 within the wall opening. Frame halves 200 and 300 have a plurality of opposed facing fastening lugs 216 and 316, respectively. Frame halves 200 and 300 are secured together by fasteners (not shown) threaded into aligned fastening posts 216 and 316. Frame halves 200 and 300 also include two sets of alignment posts 214 and 318, respectively. Generally, alignment posts 218 and 318 engage to help align the frame halves when fitting window assembly 100 with the wall opening.

Figure 19:
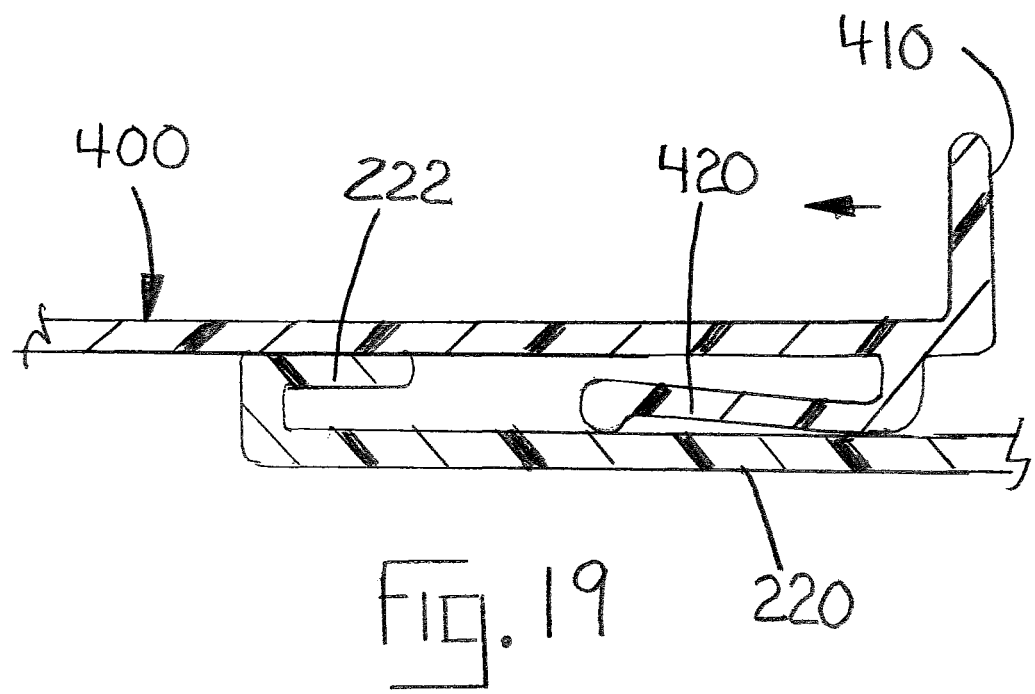
FIG. 19 is a partial sectional view of the sliding and fixed window panes shown in a partially open position.
Figure 20:
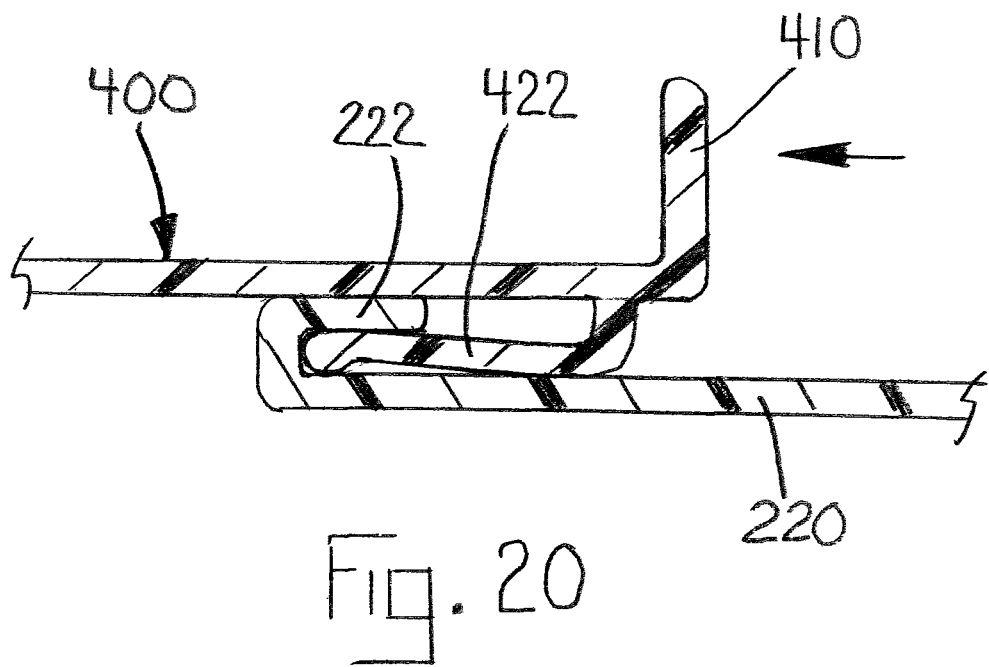
FIG. 20 is a partial sectional view of the sliding and fixed window panes shown in the closed position.

Exterior frame half 200 has an integral fixed window pane 220 that covers approximately half of the window opening. Window pane 220 is molded as an integral part of exterior frame half 200 and produced in a "two shot" molding process. The body of frame half 200 is molded in a "first molding shot", typically using an opaque polymer plastic of the desired color. Before the material of the first molding shot is cured, fixed window pane 220 is formed in a second shot using a transparent or translucent polymer, forming exterior frame half 200 with the transparent or translucent fixed window pane 220 as a single integrally molded unit. Fixed pane 220 is generally planar and extends perpendicularly from sill 210 to cover approximately half of the exterior frame half 200. Fixed window pane 220 has a U-shaped seal channel 222 that extends along its medial edge (FIGS. 19 and 20). Fixed window pane 220 also has a contact ridge 228 that protrudes from its interior face. Sliding window pane 400 slides against contact ridge 228, which helps prevent slide pane 400 from being scuffed or marred as it slides past fixed window pane 220.

Figure 9:
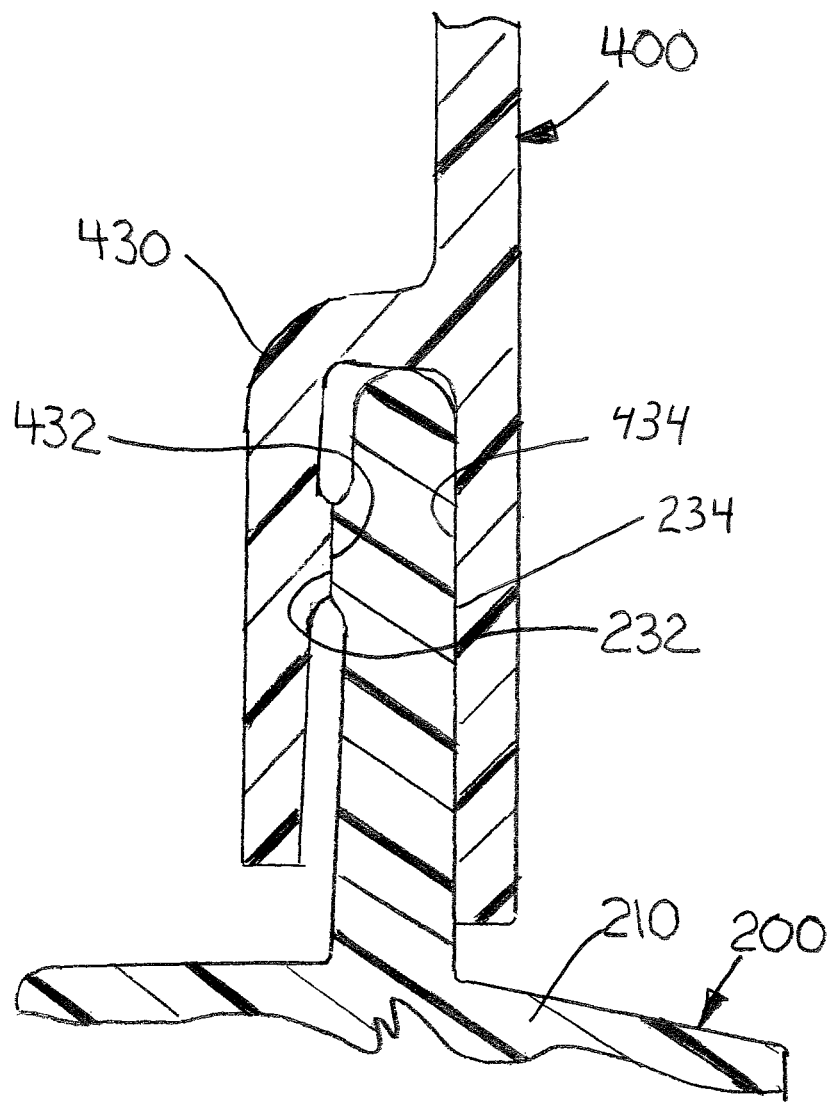
FIG. 9 is a partial sectional view of the exterior frame and sliding pane of the window assembly of FIG. 1 shown in a closed position.
Figure 10:
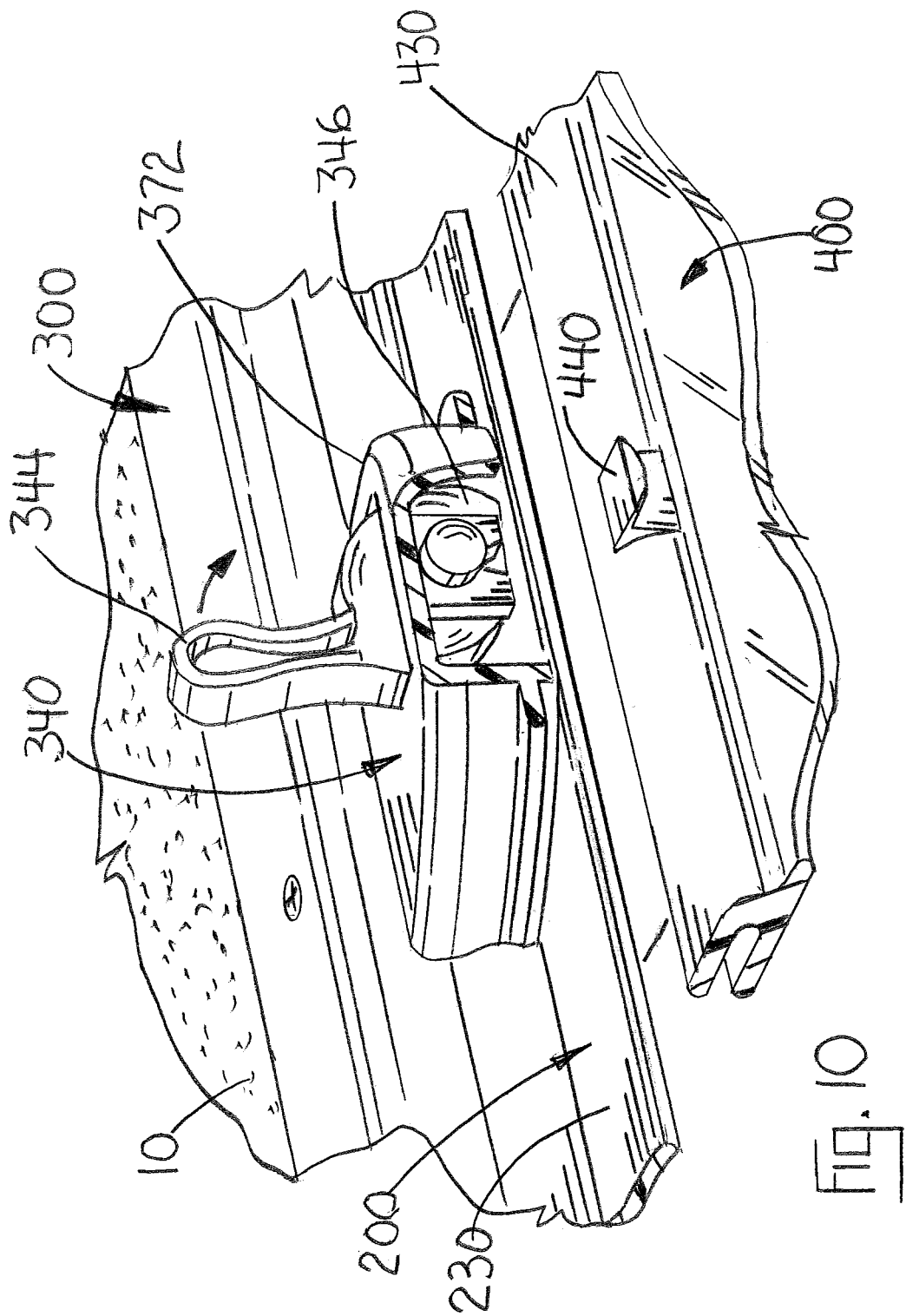
FIG. 10 is a partial perspective view of the latch mechanism of the window assembly of FIG. 1 showing the sliding pane in a partially open position.
Figure 11:
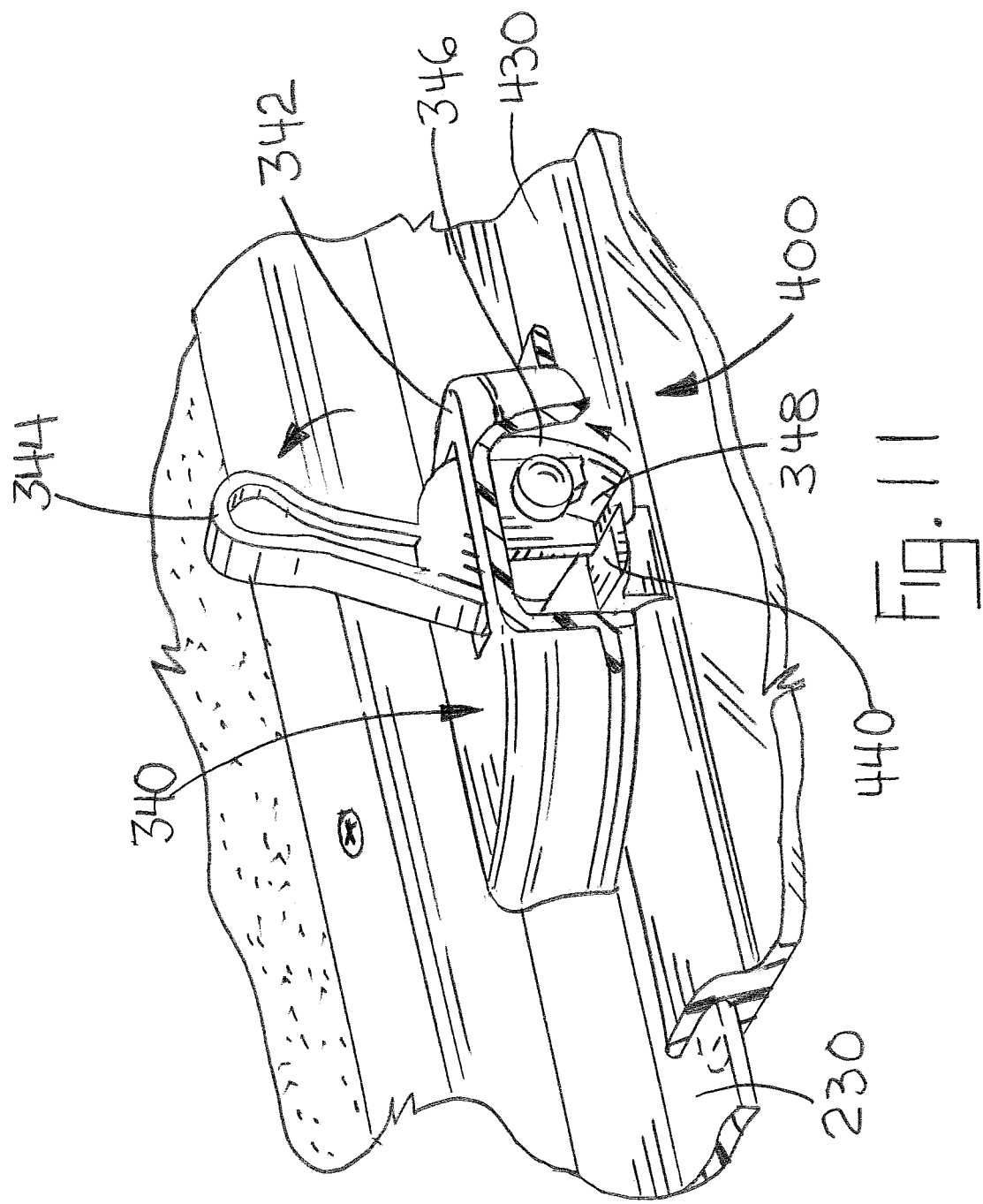
FIG. 11 is a partial perspective view of the latch mechanism of the window assembly of FIG. 1 shown engaging the sliding pane with the latch barrel in an unlocked position.

Sliding pane 400 is illustrated as a separate single transparent polymer unit; however, the window pane may take a variety of forms in other embodiments as desired for its particular application. For example, sliding window pane 400 may be transparent, translucent or opaque or consist of a peripheral frame and screen for a screen window application. As best illustrated in FIG. 9, sliding pane 400 has a generally U-shaped, continuous track channel 430 extending perpendicularly from sill 210 along its top, bottom and one of its side edges. Track channel 430 is configured to receive slide track 230 of exterior frame half 200 for sliding movement thereon. On the opposite side edge, sliding pane 400 has another U-shaped seal channel 422, which is adapted to engage seal channel 222 of fixed pane 420 when the sliding pane is fully closed (FIGS. 19 and 20). Sliding pane 400 also has a latch head 440 formed in the pane opposite of seal channel 222 and handle 410 (FIG. 4).

As shown in FIGS. 4 and 5, sliding pane 400 rides on a peripheral slide track 230 that extends perpendicularly from sill 210 of exterior frame half 200. Slide track 230 extends around the top, bottom and one side of exterior frame half

200. The U-shaped track channel 430 seats over slide track 230 allowing sliding pane 400 to be manually slid between a closed position (FIG. 6) and an open position (FIG. 8). In the closed position, track channel 430 is seated atop slide track 230 along the top, bottom and side of exterior frame half 200. Also in the closed position, seal channel 422 seats against seal channel 222 of fixed window pane 220 to enclose and seal the gap between the fixed and sliding window panes. When slid back from the closed position, sliding pane 400 slides along track 230 with only the top and bottom sections of track channel 430 riding along the top and bottom sections of track 230.

Referring now specifically to FIGS. 5-8, slide track 230 and track channel 430 each have a plurality of complimentary facing contact pads 232 and 432, respectively. Contact pads 232 and 432 align and engage against one another when sliding pane 400 is in the closed position to eliminate any movement or "chatter" from the sliding pane within window assembly 100. Contact pads 232 protrude from one side of slide track 230 and are spaced over the length of its top, bottom and side sections. Similarly, contact pads 432 protrude internally from track channel 430 to directly face contact pads 232. As shown best in FIGS. 6-8, contact pads 232 and 432 are oriented to vertically align along the side section of slide track 230 and track channel 430. Along the top and bottom sections of slide track 230 and track channel 430, the contact pads, 232 and 432 respectively are arranged in an echelon pattern. The echelon pattern allows the contact pads 432 along the top and bottom of track channel 430 to move past contact pad 232 along slide track 230 without contacting one another as slide pane 400 moves from the closed position.

Figure 12:
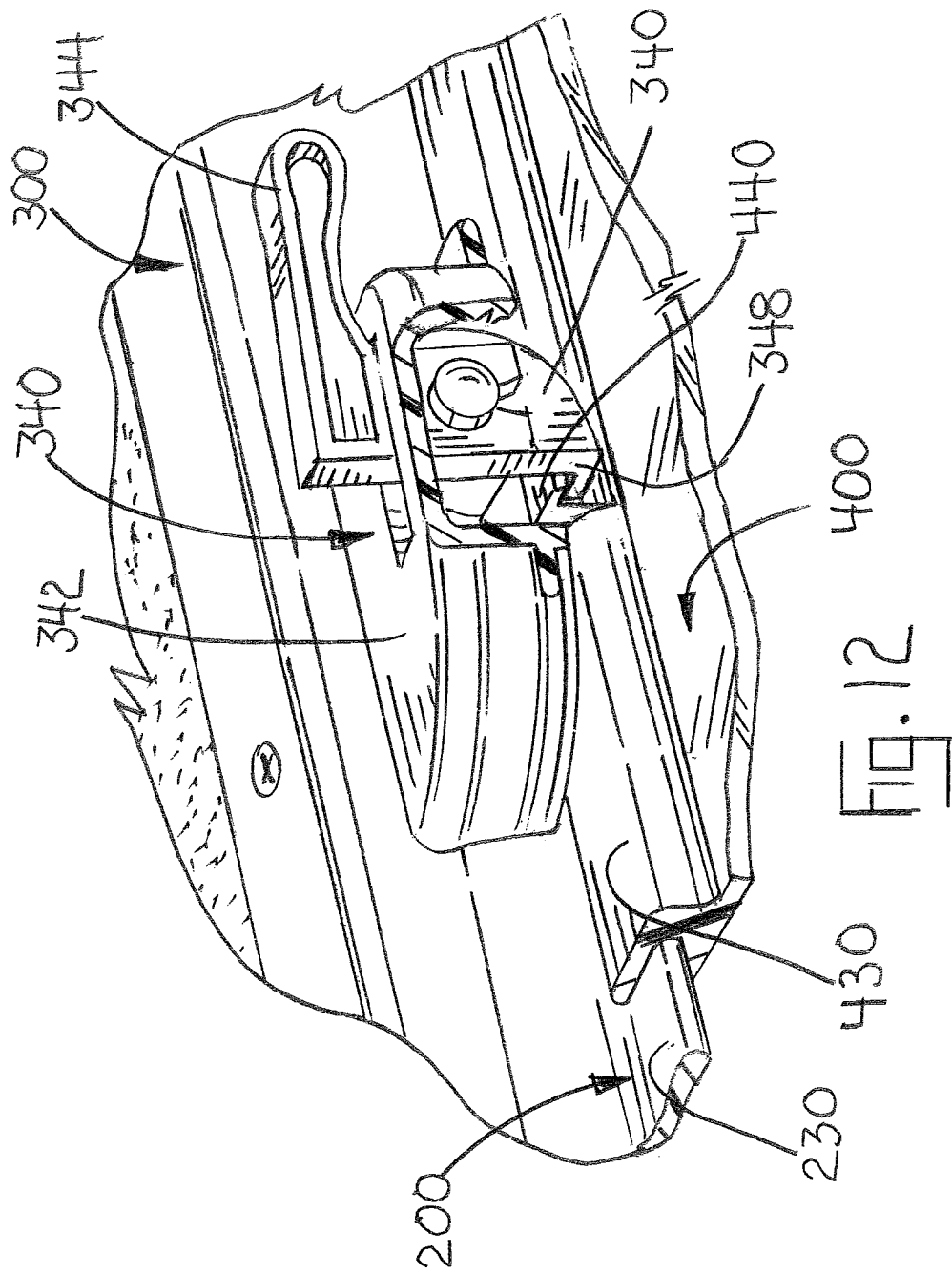
FIG. 12 is a partial perspective view of the latch mechanism of the window assembly of FIG. 1 shown engaging the sliding pane with the latch barrel in a locked position.
Figure 13:
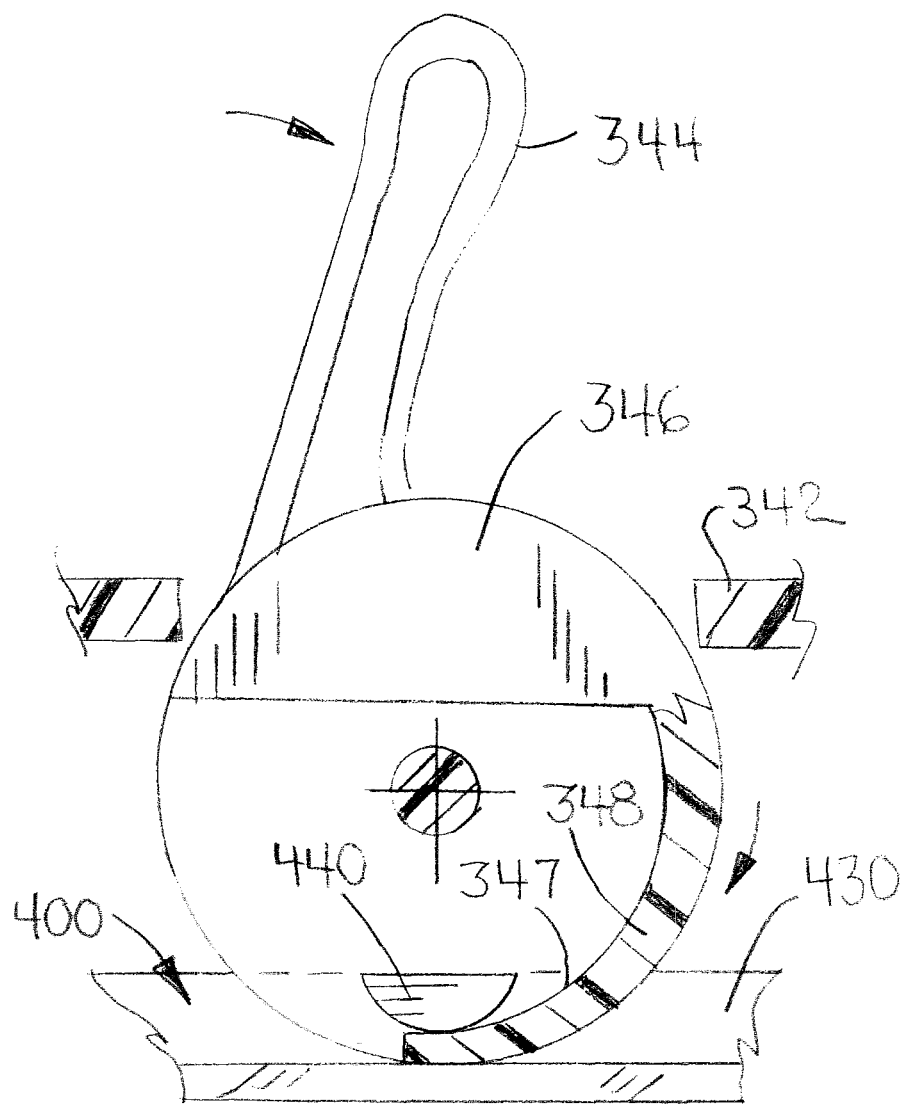
FIG. 13 is a partial front sectional view of the latch mechanism of the window assembly of FIG. 1 showing the barrel rim engaging the latch head in an unlocked position.
Figure 14:
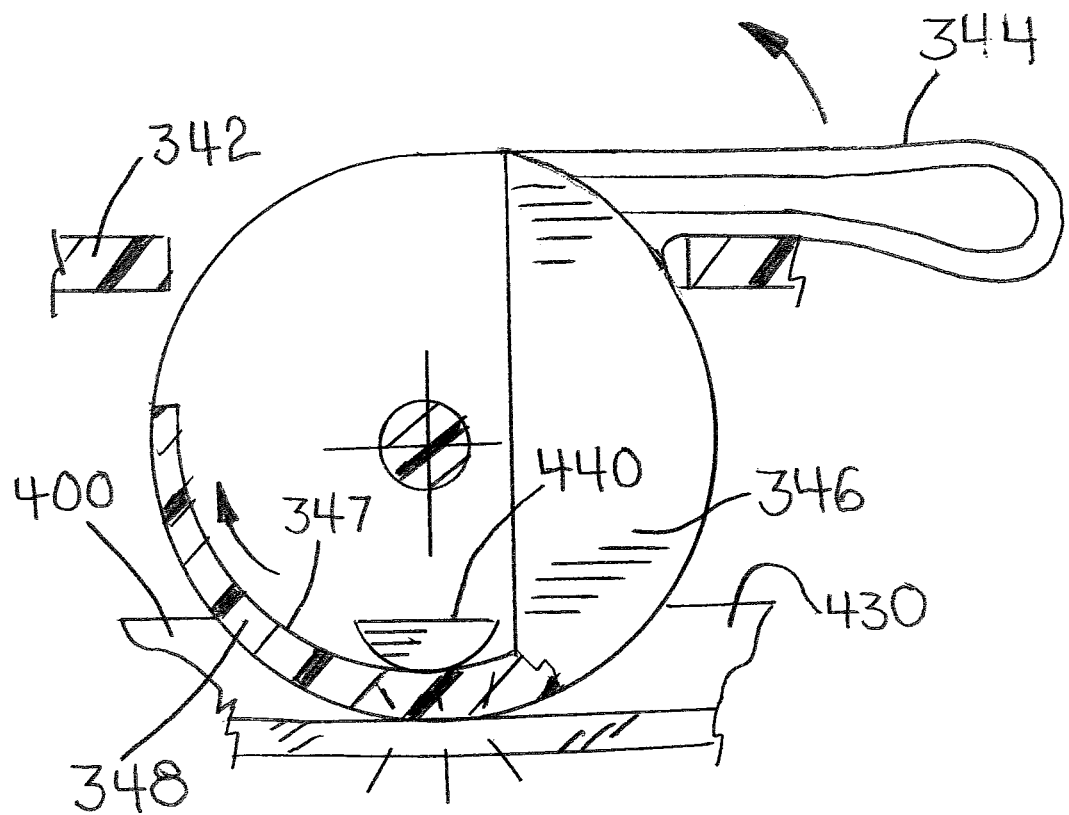
FIG. 14 is a partial front sectional view of the latch mechanism of the window assembly of FIG. 1 showing the barrel rim engaging the latch head in a locked position.
Figure 15:
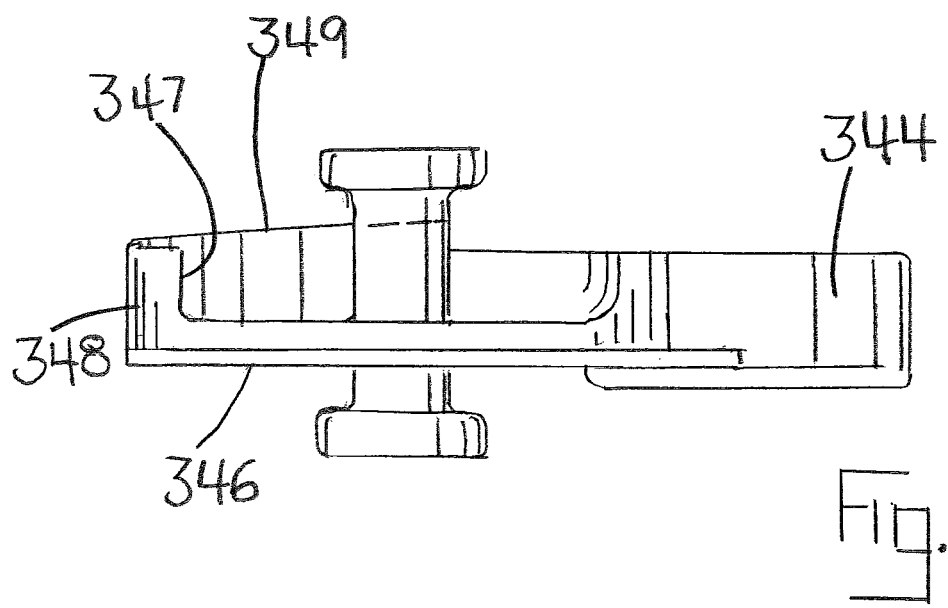
FIG. 15 is a bottom view of the latch barrel and lever arm of the latch mechanism.
Figure 16:
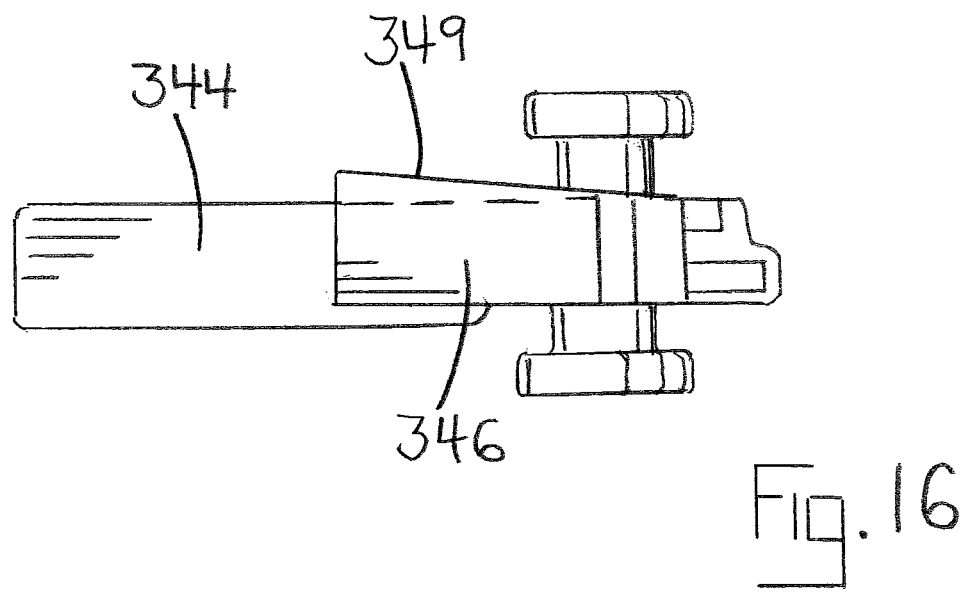
FIG. 16 is a top view of the latch barrel and lever arm of the latch mechanism.
Figure 17:
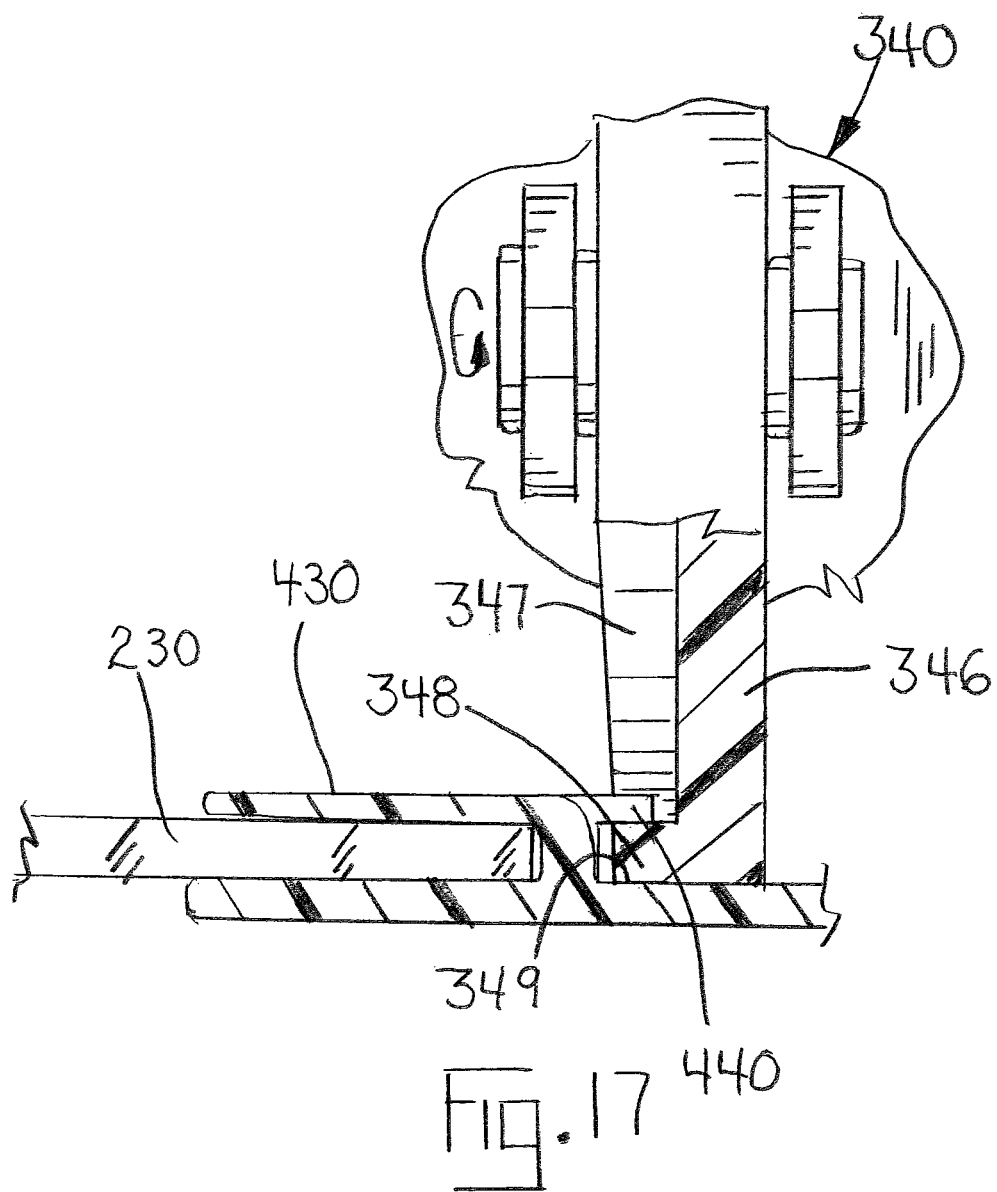
FIG. 17 is a partial side sectional view of the latch mechanism of the window assembly of FIG. 1 showing the barrel rim engaging the track channel in an unlocked position.
Figure 18:
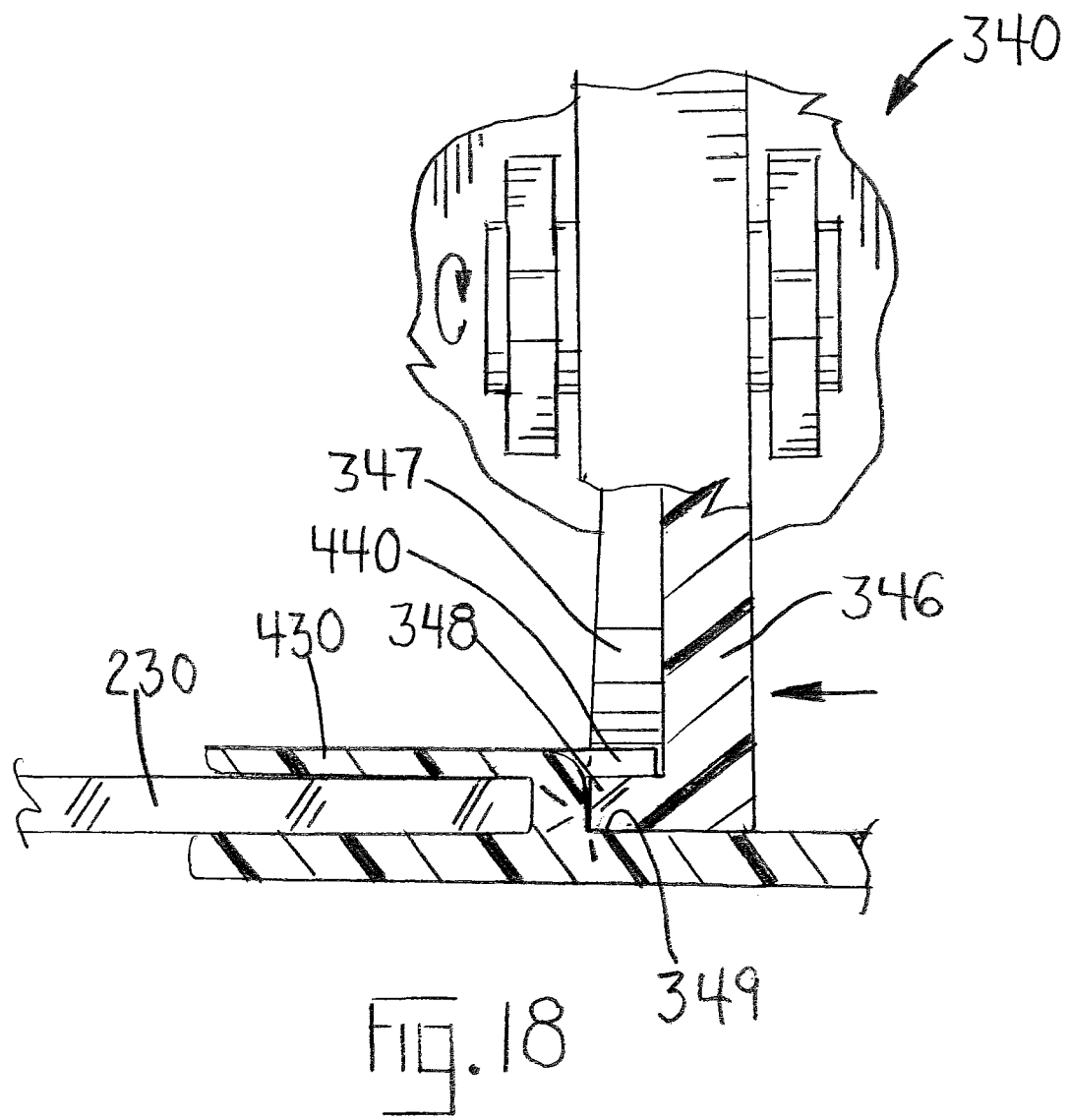
FIG. 18 is a partial side sectional view of the latch mechanism of the window assembly of FIG. 1 showing the barrel rim engaging the track channel in a locked position.

As best illustrated in FIGS. 11-19, interior frame half 300 carries a latch mechanism 340 for securing slide pane 400 in its closed position. It should be noted that latch mechanism 340 not only secures lock sliding pane 400 in the closed position, but also simply helps pull the slide pane to the fully closed position with contact pads 232 and 432 fully engaged with one another. Latch mechanism 340 includes a latch housing 342 that protrudes from the side of interior frame half 300. A pivoting lever arm 344 extends through a slot 341 in latch housing 342 from a rotating integral latch barrel 346 that pivots within the latch housing. Lever arm 344 rotates latch barrel 346 between an unlocked position (FIGS. 11, 13 and 17) and a locked position (FIGS. 12, 14 and 18). As best illustrated in FIGS. and 16, latch barrel 346 has two contact surfaces that engage latch head 440 of sliding pane 400, a concave inner face 347 of an arcuate edge rim 348 and an angled side face 349 of the rim.

When sliding pane 400 is in the closed position, arcuate face 147 swipes underneath latch head 440 to hold sliding pane 400 in the closed position with the rotation of barrel 146 between the unlocked to locked position. The body of rim 148 is tapered slightly to fully engage latch head 440 when barrel 346 is rotated to its locked position (FIGS. 12, 14 and 18). Angled side face 349 abuts against the edge of track channel 430 to push sliding pane 400 fully to the closed position. Once the end of latch head 440 comes into contact with angled side face 349, barrel 346 is rotated from the unlocked position to the locked position moving the inclined side face against the end of latch head 440. The slope of angled side face 349 is selected to push slide pane 400 the final few millimeters towards the fully closed position. In the locked position, the engagement of angled side face 349 of barrel 346 against the edge of track channel 430 fully seats sliding pane 400 in the closed position.

Figure 21:
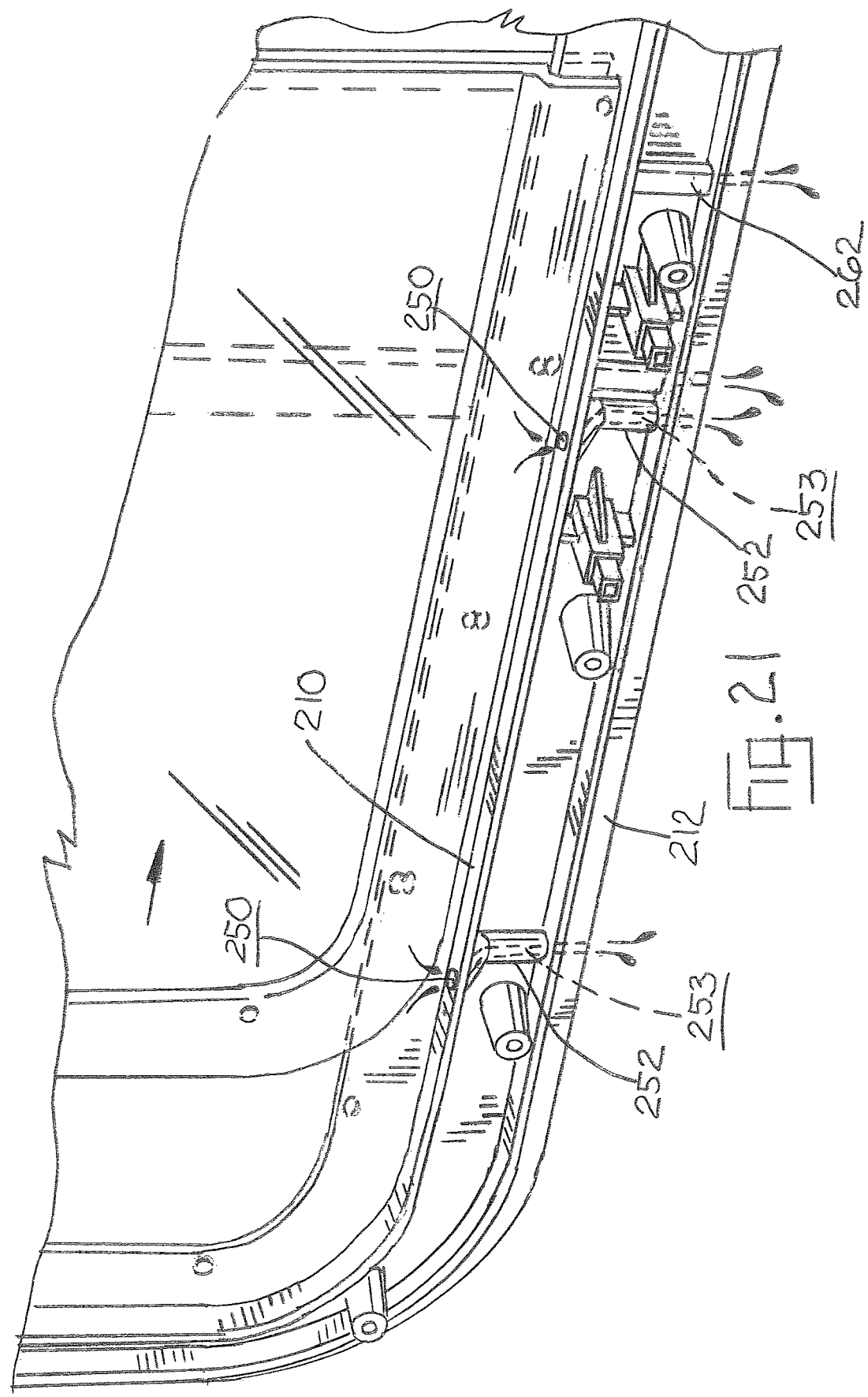
FIG. 21 is another interior perspective view of the exterior frame and sliding pane of the window assembly of FIG. 1 shown in an open position.
Figure 22:
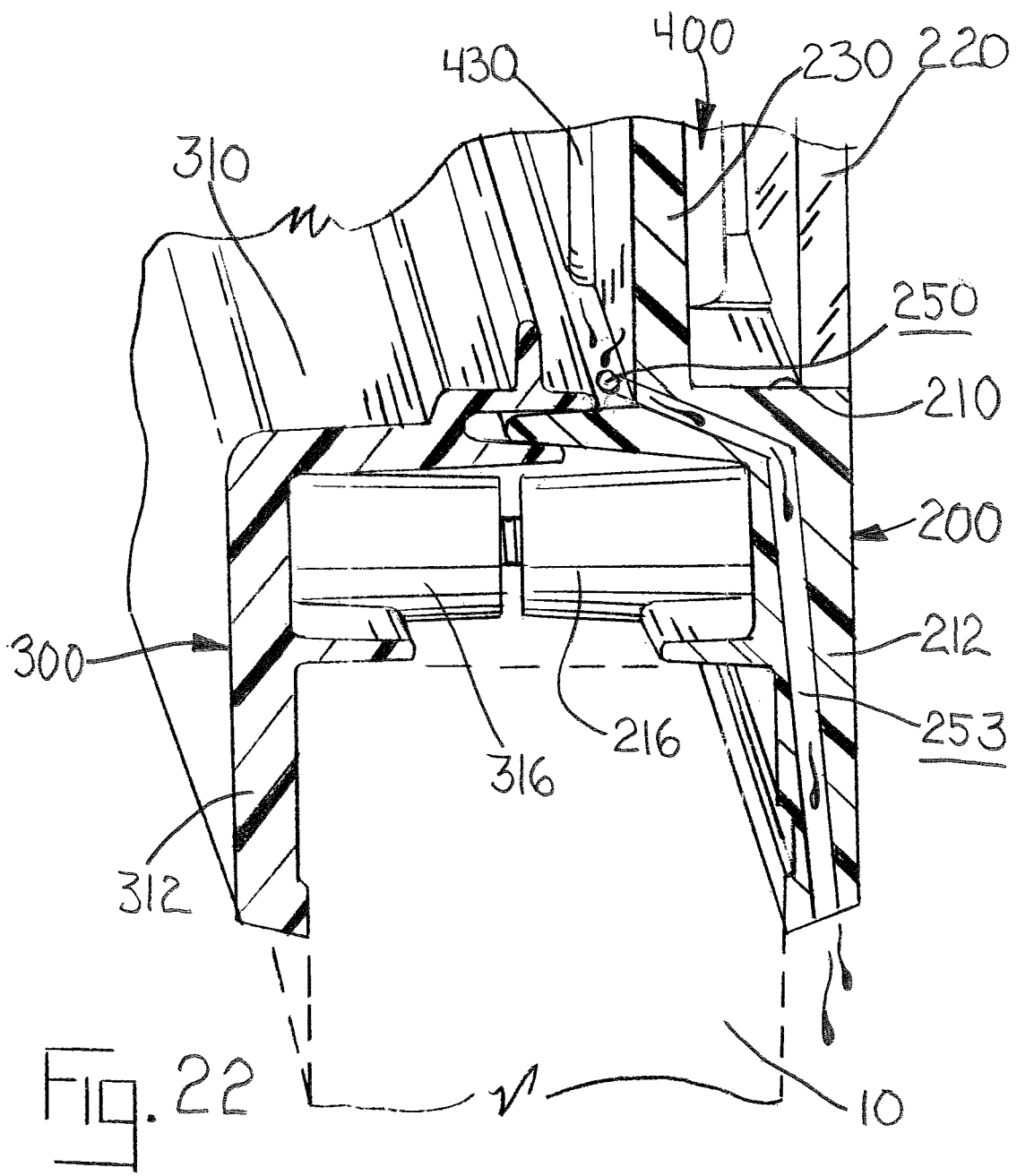
FIG. 22 is a partial side sectional view of the window assembly of FIG. 1.
Figure 23:
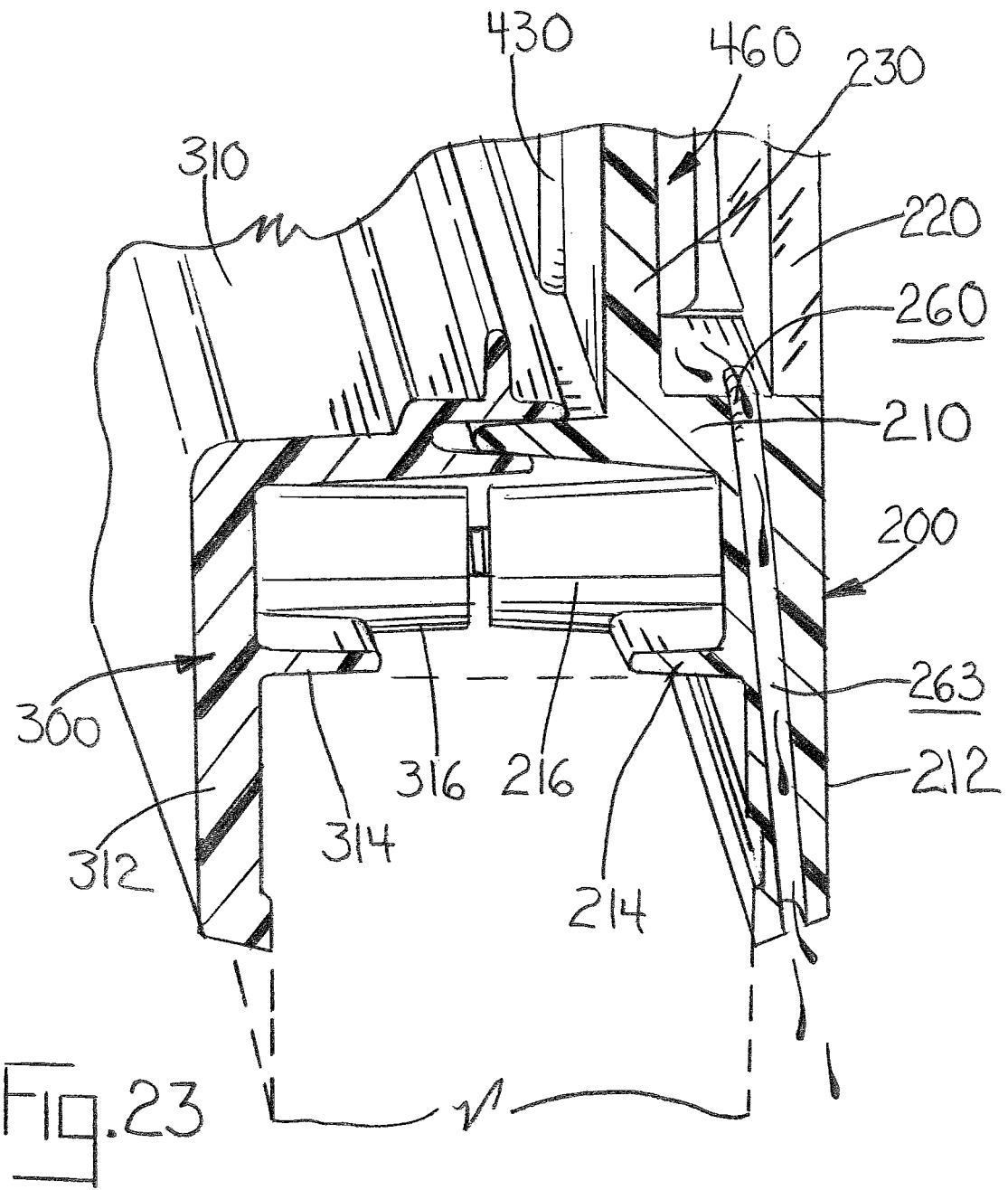
FIG. 23 is another partial side sectional view of the window assembly of FIG. 1.

As best illustrated in FIGS. 21-23, exterior frame half 200 also includes a plurality of weep holes 250 and 260, which allow water to escape without compromising the integrity of window assembly 100. Weep holes 250 are formed in sill 210 on the interior side of track 230. Weep holes 250 descend into passage 253 formed in an integral conduit 252. Passage 253 also extends through to the bottom of edge of apron 212, which allows water to exit window assembly 100 on the outside of wall 10. As shown, passages 253 are angled through sill 210 and vertically through to the bottom edge of apron 212. Weep holes 260 are formed in sill 210 on the exterior side of track 230. Again holes 260 descend into passage 263 formed in a conduit 262. Passages 263 extend vertically through sill 210 and apron 212, which allows water to exit window assembly 100 on the outside of wall 10.

FIGS. 24-26 illustrate another exemplary embodiment of the window assembly, designated as reference numeral 500. Window assembly 500 is identical to window assembly 100 in construction and function, but replaces the complimentary facing contact pads with a angled continuous contact surfaces on the slide track and slide pane channel. As best shown in FIGS. 25 and 26, Slide track 520 has a continuous tapered contact surface 522 that begins along the side edge opposite the fixed pane and tapers uniformly to the opposite distal ends of the track. Slide track 520 is thickest along the side edges (FIG. 25) and gradually narrows toward the fixed pane end (FIG. 26). Similarly, U-shaped track channel 530 has a complimentary tapered contact surface 532. Track channel 530 has an outer channel wall 532 whose wall width is opposite the slide track 520 (FIGS. 25 and 26). It should be noted that both slide track 520 and track channel 530 have flat, non-tapered mating surfaces 524 and 534, respectively opposite their corresponding tapered contact surfaces. The complimentary contact surfaces of sidle track 520 and track channel 530 seat against one another when the sliding pane is in the closed position. Again the engagement of the contact surfaces eliminates any movement or "chatter" from the sliding pane within window assembly 500.

One skilled in the art will note certain advantages provided this invention over conventional window assemblies. The integration window pane of the fixed window pane into a unitary molded frame component reduces the overall weight of the window assembly without sacrificing functionality or increasing fabrication or installation costs. The contact pads and latch mechanism are integrated into the molded construction of the frame halves and sliding pane and securely hold the sliding pane closed. Moreover, the engagement of the contact pads of the slide track and track channel reduce window chatter. Incorporating weep holes in the exterior frame half allows any water or condensation that may collect on the window panes and fall into the window assembly to drain through the exterior frame half and exit the window assembly along an exterior wall. Consequently, no water and moisture collects within the window assembly, which can migrate through the window frame into the walls, thereby reducing the need for other weather proofing measures.

It should be apparent from the foregoing that an invention having significant advantages has been provided. While the invention is shown in only a few of its forms, it is not just limited but is susceptible to various changes and modifications without departing from the spirit thereof. The embodiment of the present invention herein described and illustrated is not intended to be exhaustive or to limit the invention to the precise form disclosed. It is presented to explain the invention so that others skilled in the art might utilize its teachings. The embodiment of the present invention may be modified within the scope of the following claims.

We claim:

1. A window assembly adapted to fit within a wall opening of a wall having a first wall side and a second wall side, the window assembly comprising:

an interior frame half adapted to fit about the wall opening and overlay the first wall side;

an exterior frame half adapted to fit about the wall opening and overlay the second wall side, the exterior frame connected to the interior frame half to encircle the wall opening; and a sliding window pane carried by the exterior frame half for sliding movement between an open position spaced behind the fixed window pane and a closed position slid away from a fixed window pane to fully enclose the wall opening, the exterior frame half has a peripheral sill extending around the wall opening and a track part extending from the sill, the sliding window pane riding along the track part between the open position and the closed position, the sliding window pane having a U-shaped track channel affixed thereto, the U-shaped track channel shiftably seated atop the track part for movement with the sliding window pane along the track part when the sliding window pane moves between the open position and the closed position, the track channel having a first set of contact pads formed therein, the track part having a second set of contact pads complementary to the first set of contact pads such that the first set of contact pads abut against the second set of contact pads when the sliding pane is in the closed position.

2. The window assembly of claim 1 wherein the first set of contact pads pass by the second set of contact pads when the sliding pane moves from the closed position to the open position.

3. The window assembly of claim 2 wherein the first set of contact pads are arranged in an echelon pattern on the track channel, and the second set of contact pads are arranged in a corresponding echelon pattern on the track part.

* * * * *